April 21, 1970     S. J. ZANONI     3,507,456
TENSION ISOLATING RETRACTOR
Filed March 28, 1968
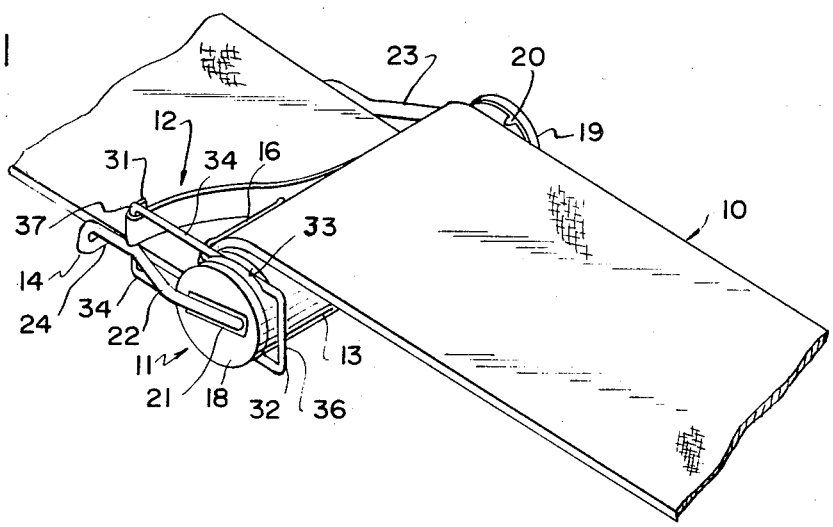
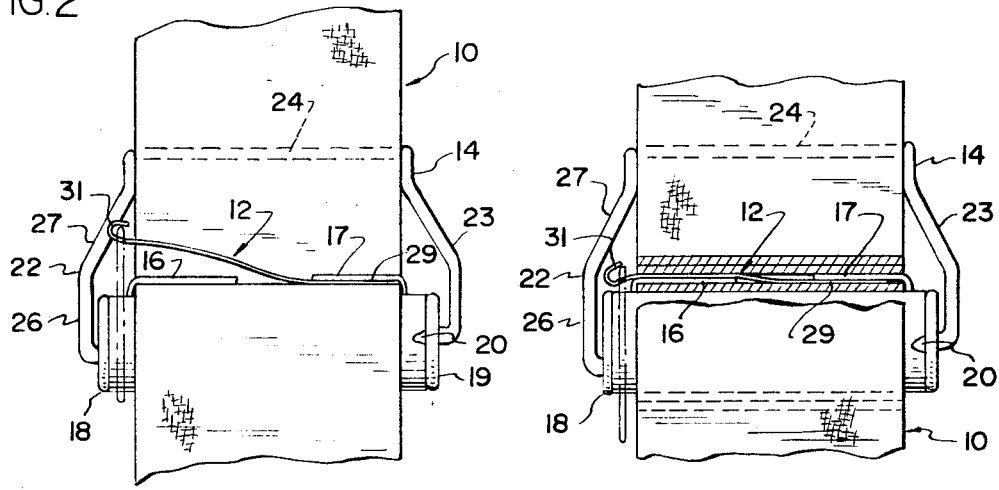
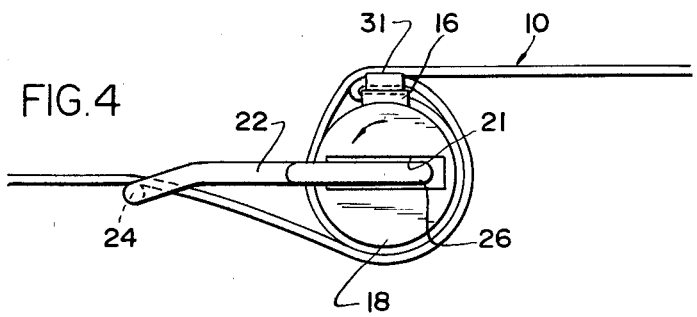
INVENTOR.
STEPHEN J. ZANONI
BY Herman E. Smith
ATTORNEY.

3,507,456
TENSION ISOLATING RETRACTOR

Stephen J. Zanoni, Glen Ellyn, Ill., assignor to Borg-Warner Corporation, Chicago, Ill., a corporation of Delaware
Filed Mar. 28, 1968, Ser. No. 716,896
Int. Cl. B65h 75/48
U.S. Cl. 242—107.12                     6 Claims

ABSTRACT OF THE DISCLOSURE

A retractor for a safety belt is provided with a releasable rewind lock which counteracts the rewinding torque of the retractor when the belt is fully extended.

SUMMARY OF THE INVENTION

The present invention relates generally to belt retractors and more particularly to a releasable rewind lock therefor.

The adoption of safety restraining belts in large numbers of motor vehicles has resulted in objections to the effect that loose belts obstruct the passenger when entering or leaving the vehicle, and that the belts become soiled or interfere with closing the vehicle door. These objections have been met to a significant degree by providing retractor devices which wind the belt into a coil when not in use. Many such devices exert a rewind bias on the belt such that retraction will occur as soon as the buckle is released. The rewind bias is felt as a slight pressure on the body of the passenger which is sometimes objectionable.

It is therefore an object of the present invention to provide a releasable rewind lock for a belt retractor which becomes effective, when the belt is fully extended, to isolate rewind tension from the belt. This removes pressure from the body of the passenger inasmuch as the belt is fully extended from the retractor when in use.

BRIEF DESCRIPTION OF THE DRAWING

FIGURE 1 is a perspective sketch of a belt retractor having a rewind locking member according to the present invention;

FIGURE 2 is a plan view of the apparatus shown in FIGURE 1;

FIGURE 3 is a view similar to FIGURE 2, showing the rewind locking member in inactive position; and, FIGURE 4 is an elevation view of the retractor showing the rewind locking member in inactive position.

DESCRIPTION OF THE PREFERRED EMBODIMENT

Referring now to the drawing and more particularly to FIGURE 1 thereof, there is shown a safety restraining belt 10, having a retractor apparatus 11 connected thereto, said retraction apparatus being provided with a rewind locking member 12, according to the present invention.

Retractor 11 includes spring driven reel 13 and a reaction bail 14, which are rotatable relative to each other. The body of reel 13 is provided with a pair of belt fasteners 16, 17 for securing retractor 11 to the end members 18 and 19, end member 19 being keyed to reel 13 by projection 20, and being rotatably journalled on a portion of reaction bail 14. End member 18, on the other hand, is keyed to reaction bail 14 by means of slot 21, and is rotatably journalled in reel 13. A torsion spring (not shown in the drawing) is located inside reel 13 and has its respective ends connected to end members 18, 19. Thus, rotation of reel 13 with respect to reaction bail 14, in one direction, is effective to wind the spring, after which the spring becomes effective to produce rotation of the reel in the opposite direction.

Reaction bail 14 includes a pair of side arms 22 and 23, joining with a transverse reaction bar 24. Side arm 22 includes a first portion 26 extending generally perpendicularly with respect to reel 13, merging into an angular portion 27 extending toward an edge of belt 10.

As shown more particularly in FIGURE 2, rewind locking member 12 is in the form of a finger-like cantilever leaf spring having a base portion 29 and a loop portion 31. Base portion 29 is anchored to belt fastener 17 such that loop portion 31 is disposed beyond the edge of belt 10. The resilience of locking member 12 urges loop portion 31 radially outwardly of reel 13 into interfering engagement with angular portion 27 of side arm 22. Inasmuch as rewind locking member 12 is secured to reel 13, interference of loop portion 31 with side arm 22 prevents rotation of the reel with respect to reaction bail 14 and thereby isolates rewind torque to the retractor structure. Thus, rewind torque is not applied to the belt and no pressure is exerted by the belt on the body of the passenger.

In order to retract the belt, loop portion 31 of locking member 12 is manually moved toward the body of reel 13. As soon as loop portion 31 is moved out of interfering engagement with angular arm portion 27, the rewind torque of the retractor is again applied to the belt. When the rewind torque is applied to the belt, the retractor begins to rewind the belt onto the reel in a double spiral coil. As shown in FIGURE 3, once loop portion 31 is out of engagement with angular arm portion 27, a convolution of the belt further depresses locking member 12, thereby retaining locking member 12 and loop portion 31 closely adjacent the surface of reel 13 during retraction. Locking member 12 is thus retained in an inactive position to avoid unintended reengagement of locking member 12 with side arm 22.

Inasmuch as loop portion 31 of locking member 12 is movable toward and from the surface of reel 13, and inasmuch as locking member 12 is preferably made of a thin strip of spring steel, it may be desirable in some application to provide a guide for locking member 12. Such a guide is shown in FIGURE 1, indicated by reference character 32. Where the guide 32 is employed, reel 13 is provided with a pair of slots 33, only one of which is visible in FIGURE 1. Guide 32 includes a pair of parallel side members 34, which are received in slots 33. Side members 34 terminate in end portions 36, 37, end portion 36 providing a stop engageable with the surface of reel 13, while end portion 27 provides a connection engageable with loop portion 31. The length of guide 32 is such that radial movement of loop 31 is limited by engagement of end portion 36 with the body of reel 13, and such that when locking member 12 is moved to inactive position, the guide will rotate with reel 13 while avoiding interference with side arm 22.

A further benefit of guide 32 is that it provides a manual operator for moving locking member 12 to its inactive position. Although guide 32 is shown as having a rectangular form, its configuration may be varied if desired. For example, side members 34 may include protuberant portions or knurled portions, to assist the user in sliding the guide with respect to slots 33.

While a preferred embodiment of the invention has been shown and described in the foregoing description and drawing, together with a modified form thereof, it is to be understood that further variations and modifications thereof are included within the spirit of the invention and scope of the following claims.

In the claims:
1. In the combination of retractor apparatus (11) and safety restraining belt for providing retraction and extension of said safety belt (10), including a spring motivated rotatable reel member (13) adapted to be fastened to a length of said belt and biased for winding said belt upon said reel in double spiral convolutions, said reel member (13) having a reaction bail (14) extending therefrom adapted to bear against said belt, the improvement comprising a releasable locking member (12) engageable with said reaction bail (14) in response to extension of a predetermined length of said belt from said reel member, said locking member (12) providing stop means (31) preventing rotation of said reel with respect to said bail in the retraction direction when engaged therewith, said locking member (12) being disposed between convolutions of said belt when said belt is retracted upon said reel, said belt convolutions maintaining said locking means out of engagement with said bail until said predetermined length of said belt has been extended from said reel, thereby isolating said winding tension from said belt when said belt is in extended condition.

2. The invention according to claim 1 in which said releasable locking member (12) includes a yieldable resilient finger having a portion (31) thereof biased outwardly of said reel toward interfering engagement with a portion (27) of said bail, said finger being reflectable inwardly toward said reel for retention between convolutions of said belt out of interfering engagement with said bail until a predetermined amount of said belt has been extended from said reel.

3. The invention according to claim 2 in which said reel (13) is provided with a fastener (17) for securing said belt to the periphery thereof, said finger being in the form of a leaf spring secured to said fastener.

4. The invention according to claim 2 in which guide means (32) is provided extending from said reel (13) to said interfering portion (31) of said finger.

5. The invention according to claim 4 in which said guide means (32) provides a readily accessible operator for manually deflecting said finger out of interfering engagement with said bail.

6. In retractor apparatus (11) for providing retraction and extension of a safety restraining belt, said retractor including a spring motivated reel member (13) and reaction bail (14) rotatable with respect to each other, the improvement comprising a releasable locking member (12) secured to said reel member, said locking member including stop means (31) resiliently urged toward interfering engagement with said reaction bail (14), said stop means (31) being effective upon engagement with said reaction bail (14) to prevent rotation of said reel member with respect to said reaction bail (14).

References Cited

UNITED STATES PATENTS

| | | | |
|---|---|---|---|
| 3,257,147 | 6/1966 | Carter | 297—388 |
| 3,262,653 | 7/1966 | Lanpot | 242—107.11 |
| 3,323,834 | 6/1967 | Binding | 297—388 |

STANLEY N. GILREATH, Primary Examiner

W. H. SCHROEDER, Assistant Examiner

UNITED STATES PATENT OFFICE
CERTIFICATE OF CORRECTION

Patent No. 3,507,456                          April 21, 1970

Stephen J. Zanoni

It is certified that error appears in the above identified patent and that said Letters Patent are hereby corrected as shown below:

Column 3, line 24, "reflectable" should read -- deflectable --.

Signed and sealed this 15th day of December 1970.

(SEAL)
Attest:

Edward M. Fletcher, Jr.                    WILLIAM E. SCHUYLER, JR.
Attesting Officer                            Commissioner of Patents